United States Patent
Miyake et al.

(10) Patent No.: US 9,963,021 B2
(45) Date of Patent: May 8, 2018

(54) TAILGATE STRUCTURE

(71) Applicant: HONDA MOTOR CO., LTD., Tokyo (JP)

(72) Inventors: Yoshinori Miyake, Saitama (JP);
Masayuki Ogawa, Saitama (JP);
Masaru Takata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/371,250

(22) Filed: Dec. 7, 2016

(65) Prior Publication Data
US 2017/0174058 A1    Jun. 22, 2017

(30) Foreign Application Priority Data

Dec. 16, 2015 (JP) ................. 2015-245065

(51) Int. Cl.
| | | |
|---|---|---|
| *B60J 5/10* | (2006.01) | |
| *B62D 29/00* | (2006.01) | |
| *E05B 79/04* | (2014.01) | |
| *E05B 77/02* | (2014.01) | |

(52) U.S. Cl.
CPC ............ *B60J 5/107* (2013.01); *B60J 5/101* (2013.01); *B62D 29/001* (2013.01); *E05B 79/04* (2013.01); *E05B 77/02* (2013.01)

(58) Field of Classification Search
CPC ..... B60J 5/10; B60J 5/101; B60J 5/106; B60J 5/107
USPC ............................. 296/50, 56, 106
See application file for complete search history.

(56) References Cited

U.S. PATENT DOCUMENTS 8,991,898 B2 * 3/2015 Iwano .................. B60J 5/0429
296/146.6
2012/0002434 A1    1/2012 Rajon et al.

FOREIGN PATENT DOCUMENTS

| JP | S63-76525 | 5/1988 |
| JP | 2015-047942 | 3/2015 |
| JP | 2015-058808 | 3/2015 |
| JP | 2015-067057 | 4/2015 |

OTHER PUBLICATIONS

Japanese Office Action dated Sep. 26, 2017, English translation included, 6 pages.

* cited by examiner

*Primary Examiner* — Dennis H Pedder
(74) *Attorney, Agent, or Firm* — Rankin, Hill & Clark LLP

(57) ABSTRACT

An object of the present invention is to provide a tailgate structure capable of preventing broken pieces from being scattered inside or outside a vehicle even when a tailgate made of resin receives an impact. The tailgate structure includes a tailgate 10 which is provided capable of opening and closing an opening portion 2 of a vehicle body 1, and a locking device 21 which is provided at the tail gate 10 and is engaged with the opening portion 2 in a state in which the tailgate 10 closes the opening portion 2. The tailgate 10 includes an inner panel 30 made of resin, an outer panel 40 made of resin, and a film surface member 50 made of metal, which is provided between the inner panel 30 and the outer panel 40. The film surface member 50 is fixed to the locking device 21.

9 Claims, 6 Drawing Sheets

TAILGATE STRUCTURE

CROSS REFERENCE TO RELATED APPLICATIONS

This application claims the foreign priority benefit under Title 35, United States Code, § 119 (a)-(d) of Japanese Patent Application No. 2015-245065, filed on Dec. 16, 2015, the disclosure of which is herein incorporated by reference in its entirety.

TECHNICAL FIELD

The present invention relates to a tailgate structure.

BACKGROUND ART

As a conventional tailgate structure, there has been known a tailgate structure in which a reinforcing member for improving rigidity of a tailgate is disposed between an inner member and an outer member, which are made of resin and constitute the tailgate (for example, see Patent Document 1).

CITATION LIST

Patent Literature

[Patent Document 1]
U.S. Patent Application Publication No. 2012/0002434

SUMMARY OF INVENTION

Technical Problem

However, in such a conventional tailgate structure, when a tailgate made of resin receives an impact, there has been a possibility that parts of the tailgate fall off or luggage is scattered due to opening or breakage of the tailgate, or a large hole opening in the tailgate. An object of the present invention is to provide a tailgate structure capable of preventing luggage from falling out of a vehicle due to opening or breakage of the tailgate, or a large hole opening in the tailgate, and capable of protecting an occupant from injury due to falling off of the parts, even when the tailgate made of resin receives the impact.

Solution to Problem

A tailgate structure according to the present invention includes a tailgate which is provided capable of opening and closing an opening portion of a vehicle body, and a locking device which is provided at the tail gate and is engaged with the opening portion in a state in which the tailgate closes the opening portion, wherein the tailgate includes an inner panel made of resin, an outer panel made of resin, and a film surface member made of metal, which is provided between the inner panel and the outer panel, and wherein the film surface member is fixed to the locking device.

With such a structure, the film surface member made of metal is fixed to the locking device. Therefore, even when the tailgate is broken by the impact, it is possible to receive the parts and luggage by the film surface member, so that the parts do not fall off inside or outside the vehicle, or luggage or the like is not scattered. As a result, it is possible to protect the occupant.

Further, the locking device is provided at one end of the tailgate in a direction perpendicular to a vehicle interior-exterior direction, a hinge mechanism for rotatably supporting the tailgate to the vehicle body is provided at another end of the tailgate in the direction perpendicular to the vehicle interior-exterior direction, and the film surface member is fixed to the hinge mechanism.

With such a structure, the film surface member can be a both support structure at an upper edge and a lower edge thereof by the one end and the other end of the tailgate in the direction perpendicular to the vehicle interior-exterior direction.

Further, the film surface member has a plurality of main bridge portions which are linearly bridged over from one end to another end of the film surface member in the direction perpendicular to the vehicle interior-exterior direction, and bridge portions which connect the main bridge portions to each other in a direction intersecting a direction of extension of the main bridge portions.

With such a structure, it is possible to improve rigidity in the direction intersecting the direction of extension of the main bridge portions. Therefore, it is possible to secure rigidity of a film surface at both ends of a lower portion of the tailgate.

Then, the bridge portions are connected in a direction substantially perpendicular to the main bridge portions.

With such a structure, the main bridge portions of the film surface member are connected to each other at a minimum distance by these bridge portions. Therefore, for example, as compared with a case where the bridge portions are not perpendicular to the main bridge portions, it is possible to make it difficult for the main bridge portions to be separated from each other when the tailgate receives the impact. Therefore, it is possible to effectively improve deformation resistance of the film surface member and to secure rigidity of the film surface after deformation.

Further, the film surface member is formed with a film surface opening portion passing through the film surface member by the main bridge portions and the bridge portions, and the inner panel has a projecting portion projecting toward the outer panel from the inner panel and is joined to the outer panel in a state in which the projecting portion is penetrated through the film surface opening portion.

With such a structure, since it is not necessary to form a mounting portion on an inner panel side surface of the outer panel, there is no possibility to cause sink marks or the like on a vehicle exterior side surface of the outer panel. Therefore, in a state where the outer panel is attached to the inner panel by interposing the film surface member therebetween, it is possible to improve appearance quality of a design surface located on the vehicle exterior side surface of the outer panel.

Further, the inner panel has a bridge attachment portion which is connected to the main bridge portion or the bridge portion, and the bridge attachment portion is disposed adjacent to the projecting portion.

With such a structure, as compared to a case where the projecting portion and the bridge attachment portion are arranged spaced from each other at a certain distance, it is possible to reduce deviation of a load applied to the inner panel from the film surface member and the outer panel, thereby stabilizing an attachment state even when there are three members of the inner panel, the outer panel and the film surface member.

Advantageous Effects of Invention

According to the present invention, it is possible to provide a tailgate structure capable of preventing luggage from falling out of a vehicle due to opening or breakage of the tailgate, or a large hole opening in the tailgate, and capable of protecting occupant from injury due to falling off of the parts, even when the tailgate made of resin receives an impact. Objects, structures and effects other than those described above, will be apparent by the following description of embodiments.

DESCRIPTION OF EMBODIMENTS

Figure 1:
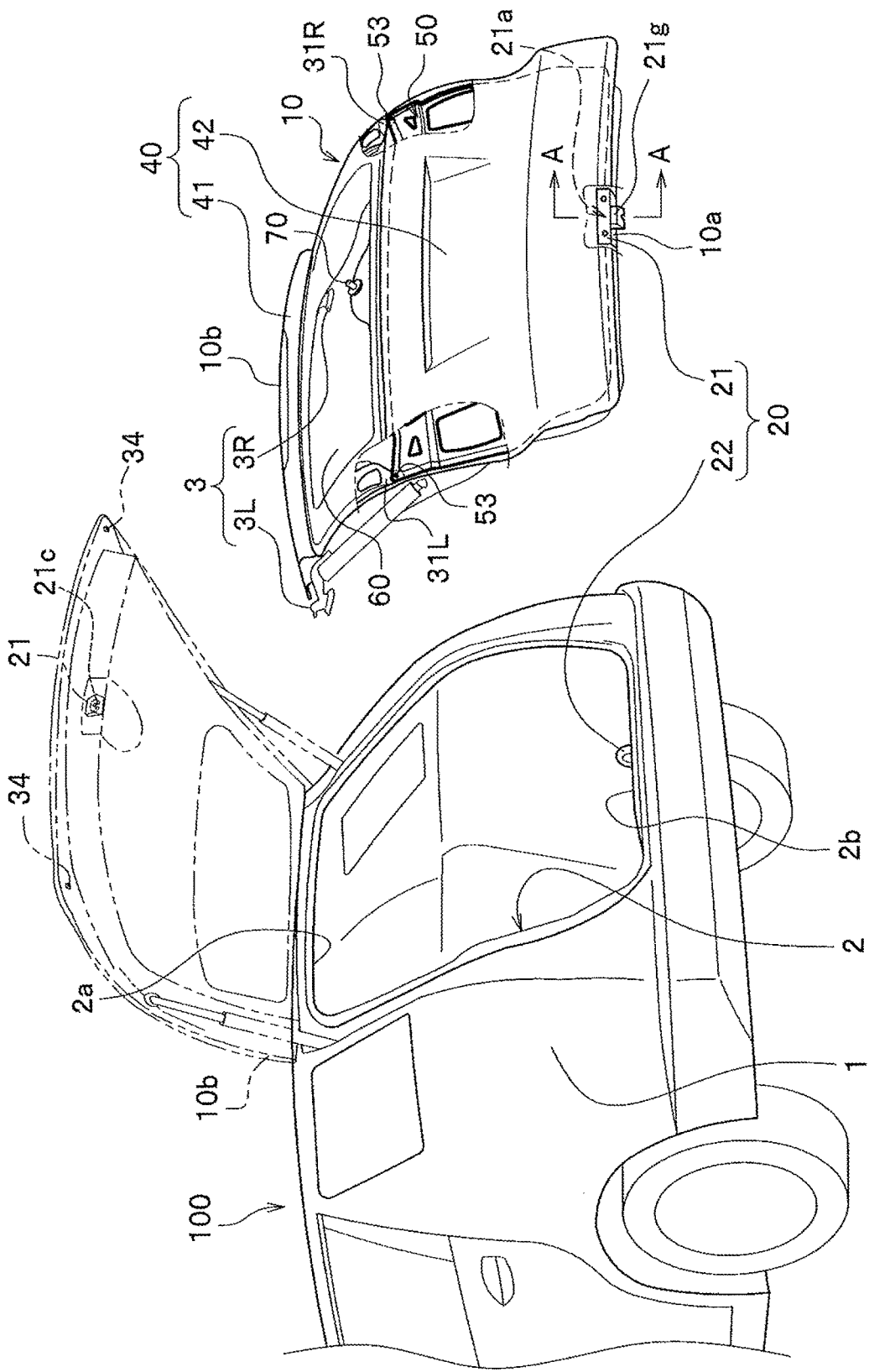
FIG. 1 is a perspective view of a vehicle rear portion showing an open state of a tailgate according to an embodiment of the present invention.

Embodiments of the present invention will be described in detail with reference to FIGS. 1 to 6. In the description, the same components are denoted by the same reference numerals, and duplicated descriptions will be omitted. Further, when directions are described, they will be described based on front, rear, left, right, up and down directions as seen from a driver of the vehicle. Note that, a vehicle width direction and a left-right direction have the same meaning.

Figure 2:
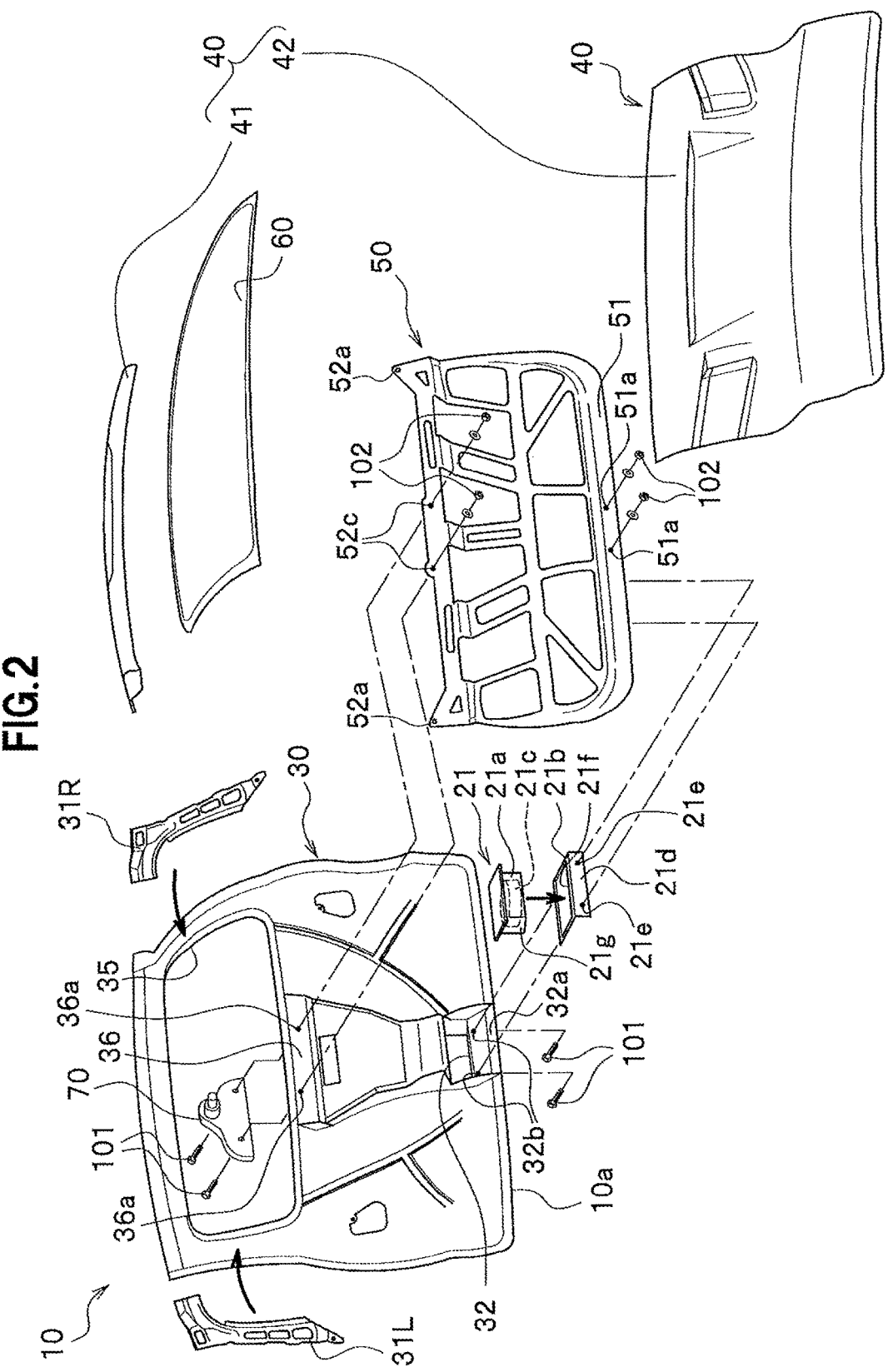
FIG. 2 is an exploded perspective view of a tailgate structure according to the embodiment.
Figure 3:
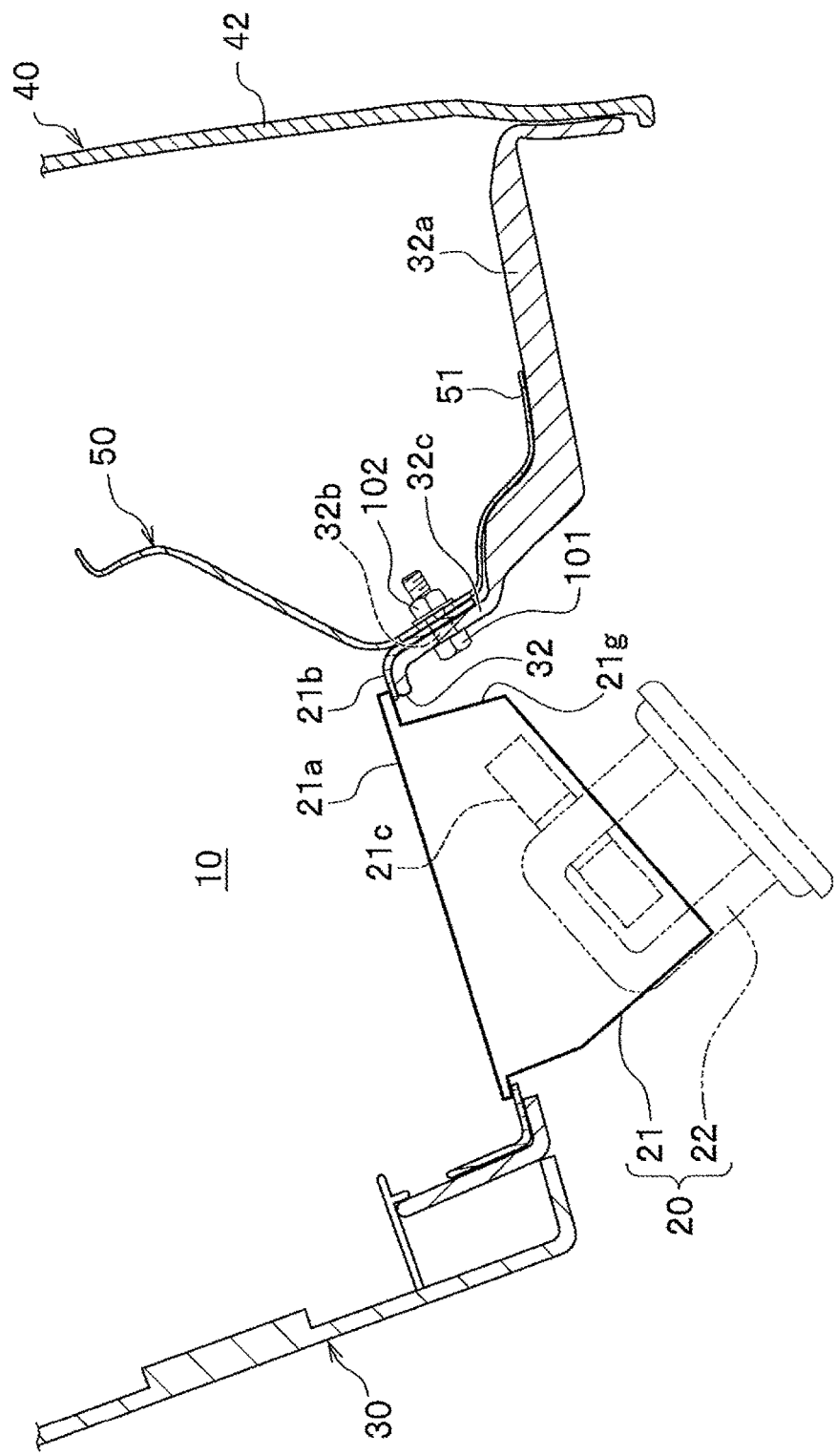
FIG. 3 is the tailgate structure of the embodiment, showing a state in which a film surface member is fixed to an inner panel, and is a cross-sectional view taken along a line A-A in FIG. 1.
Figure 4:
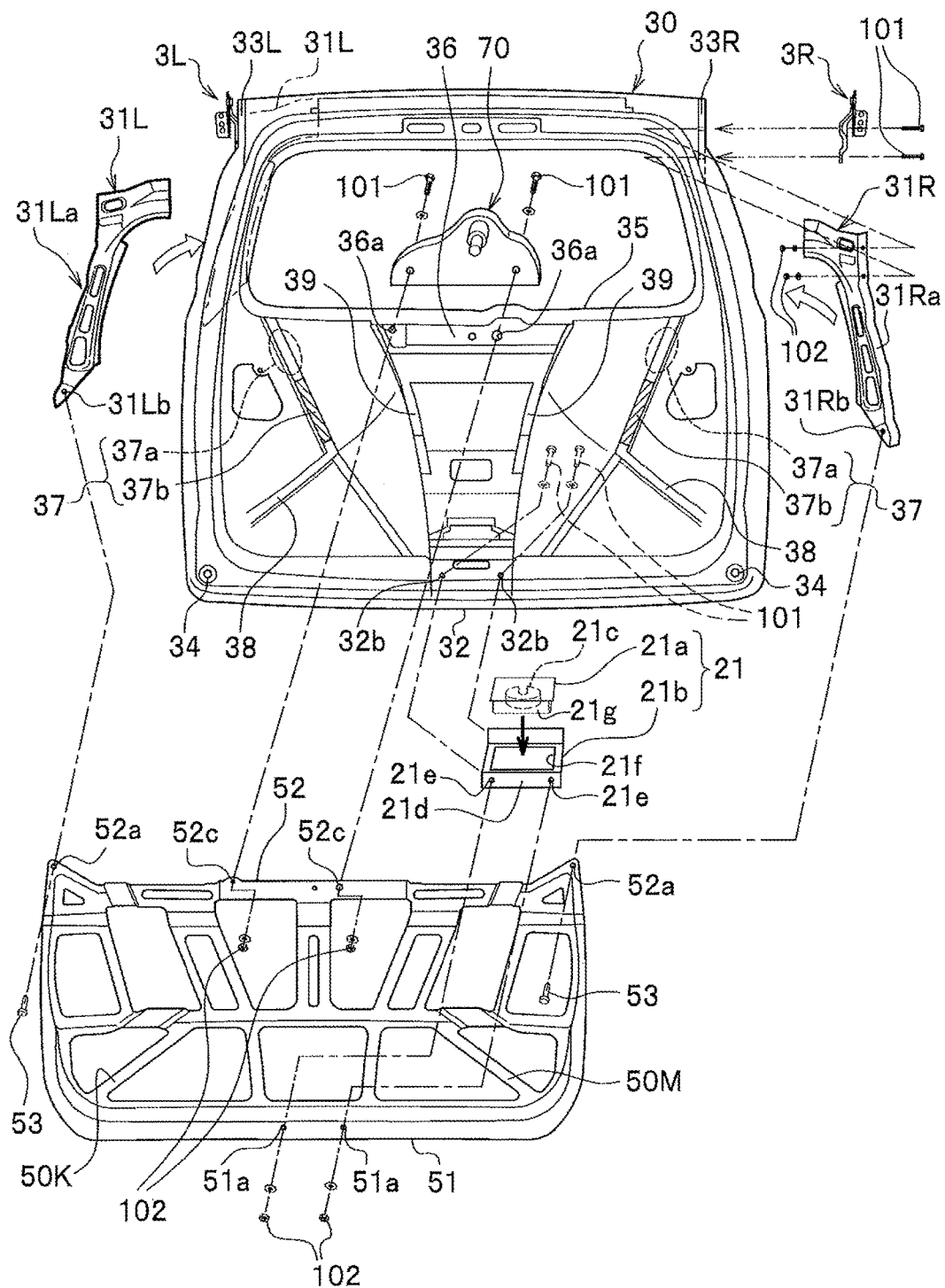
FIG. 4 is the tailgate structure of the embodiment, and is an exploded perspective view describing a manner of fixing the film surface member to the inner panel, when viewed from a rear of a vehicle.
Figure 5:
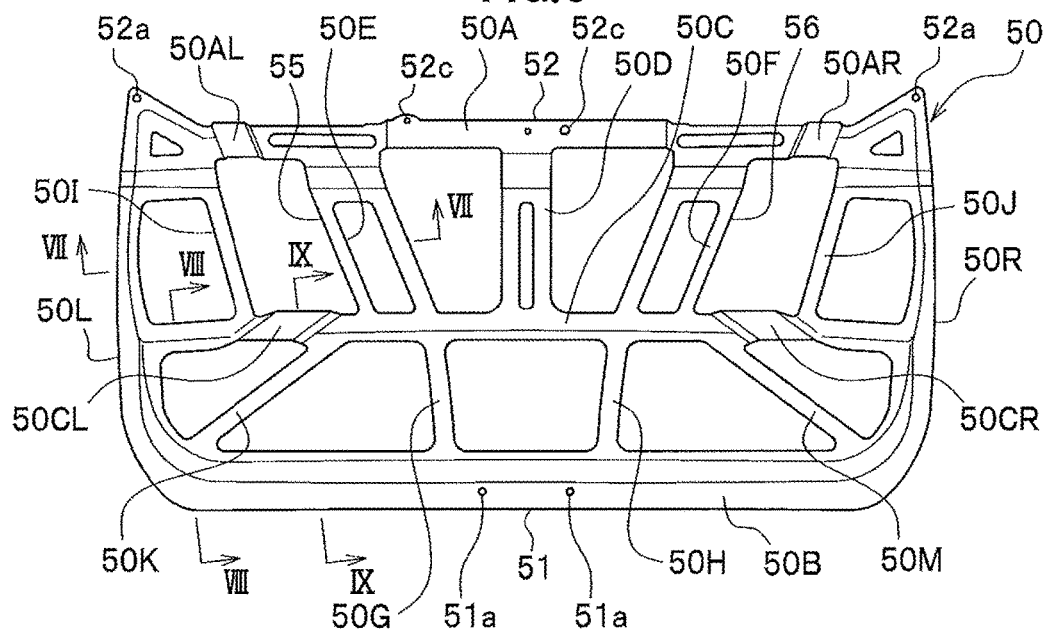
FIG. 5 is a front view of the film surface member used in the tailgate structure of the embodiment.
Figure 6:
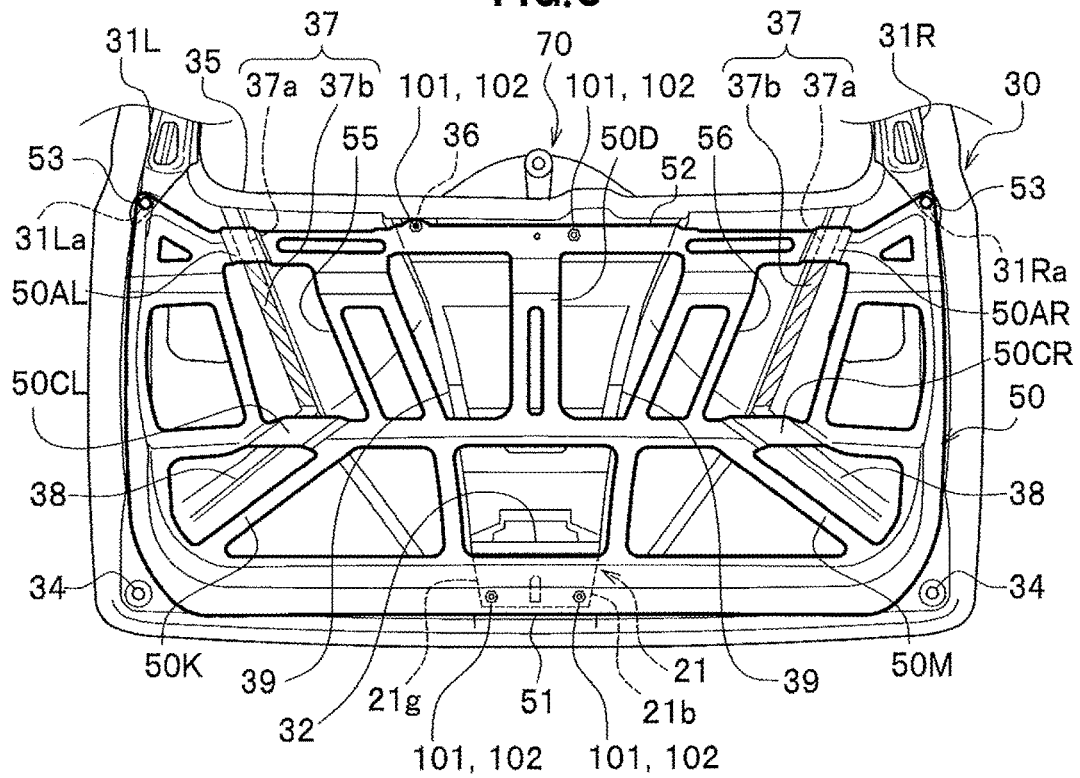
FIG. 6 is the tailgate structure of the embodiment, and is a front view showing the state in which the film surface member is fixed to the inner panel.

FIG. 1 is a perspective view of a vehicle rear portion showing an open state of a tailgate according to an embodiment of the present invention. FIG. 2 is an exploded perspective view of a tailgate structure according to the embodiment. FIG. 3 is the tailgate structure of the embodiment, showing a state in which a film surface member is fixed to an inner panel, and is a cross-sectional view taken along a line A-A in FIG. 1. FIG. 4 is the tailgate structure of the embodiment, and is an exploded perspective view describing a manner of fixing the film surface member made of metal to the inner panel, when viewed from a rear of a vehicle. FIG. 5 is a front view of the film surface member used in the tailgate structure of the embodiment. FIG. 6 is the tailgate structure of the embodiment, and is a front view showing the state in which the film surface member is fixed to the inner panel.

(Overall Structure of Vehicle Body)

As shown in FIG. 1, a vehicle 100 with the tailgate structure according to the embodiment has an opening portion 2 at a rear portion of a vehicle body 1. Note that, the vehicle 100 may be, for example, a towed vehicle such as a camping car or a trailer, which does not have a drive wheel, in addition to an automobile provided with a power unit such as an engine, a transmission or an electric motor, which is a power source for the drive wheel, and types of the vehicle are not limited.

A tailgate 10 is attached to an upper edge 2a of the opening portion 2 via a hinge mechanism 3 including left and right hinge mechanisms 3L, 3R. The left and right hinge mechanisms 3L, 3R of the hinge mechanism 3 respectively has a rotary shaft in the vehicle width direction, and rotatably support the tailgate 10 in a vehicle up-down direction.

The tailgate 10 includes a locking device 21 of a locking mechanism 20 at one end 10a thereof. The locking mechanism 20 is mainly constituted by the locking device 21 and a striker 22 fixed to a lower edge 2b of the opening portion 2 on the vehicle body 1 side. In a state in which the opening portion 2 is closed by the tailgate 10, the locking device 21 does not allow the tailgate 10 to open by engagement with the striker 22 of the opening portion 2. Then, the locking device 21 is configured to be able to open the tailgate 10 by releasing the engagement with the striker 22.

(Configuration of Tailgate)

The tailgate 10 shown in FIG. 2 mainly includes an inner panel 30 made of resin, an outer panel 40 made of resin, a film surface member 50 made of iron, which is provided between the inner panel 30 and the outer panel 40, and a rear glass panel 60.

Among them, a locking device body 21a constituting the locking device 21 is fixedly provided on the inner panel 30 via a locking stiffener 21b. Further, a rear wiper device 70 and left and right hinge stiffeners 31L, 31R of the hinge mechanism 3 are fixedly provided on a glass opening portion 35 to which the rear glass panel 60 of the inner panel 30 is attached. Then, the film surface member 50 is fixed to and supported by the rear wiper device 70, the left and right hinge stiffeners 31L, 31R of the hinge mechanism 3, and the locking device 21 provided on the inner panel 30.

Further, the outer panel 40 made of resin is attached to the inner panel 30 made of resin via the film surface member 50. The outer panel 40 includes an outer panel upper member 41 to be attached to the glass opening portion 35 side of the inner panel 30, and an outer panel lower member 42 located below the glass opening portion 35.

First, in the tailgate structure of the present embodiment, characteristic fixed sites of the film surface member 50 will be described sequentially. In the tailgate structure of this embodiment, in order to obtain relatively high mounting rigidity, the film surface member 50 is fixed to and supported by a strength member or a functional part including a rigid case, such as the rear wiper device 70, the left and right hinge stiffeners 31L, 31R of the hinge mechanism 3, and the locking device 21 of the inner panel 30.

(Fixation to Locking Device)

The tailgate 10 is equipped with the locking device 21 constituting the locking mechanism 20 and the striker 22 provided on a lower edge side of the opening portion 2 on the vehicle body side, at the one end 10a of the tailgate 10 in a direction (here, the vehicle up-down direction: see FIGS. 1, 2) perpendicular to a vehicle interior-exterior direction. As shown in FIGS. 2, 3, the locking device 21 mainly includes the locking device body 21a and the locking stiffener 21b which is provided integrally with the locking device body 21a and improves rigidity thereof. A housing 21g to form a case of the locking device body 21a has a predetermined strength as a functional part of gate locking.

Further, an engagement opening portion 21f is formed in the locking stiffener 21b. Then, the housing 21g of the locking device body 21a is engaged to be integrally combined to the engagement opening portion 21f in the vehicle up-down direction. In a state in which the locking device body 21a is inserted and fitted into the locking stiffener 21b, desired strength to support the film surface member 50 is set to the locking stiffener 21b along with the housing of the locking device body 21.

The locking device 21 of this embodiment is fixedly provided on the inner panel 30 by attaching the locking device body 21a via the locking stiffener 21b in a locking opening 32 formed on a lower edge side of the inner panel 30. Then, in the state in which the opening portion 2 is closed by the tailgate 10, the locking device 21 does not allow the tailgate 10 to open by engaging an engaging claw 21c of the locking device body 21a to the striker 22 of the opening portion 2.

That is, bolt members 101 for fixedly fastening the locking device 21 to the inner panel 30 are inserted via insertion holes 32b, 32b formed in a vertical wall portion 32c erected from a lower hem 32a of the locking opening 32 of the inner panel 30, and mounting holes 21e, 21e formed in a mounting piece 21d of the locking stiffener 21b.

Further, the bolt members 101 are inserted into mounting holes 51a, 51a formed in a lower edge 51 of the film surface member 50 in correspondence with the mounting holes 21e, 21e. Then, the bolt members 101 are screwed into nut members 102, and the inner panel 30, the film surface member 50 and the locking stiffener 21b are fastened together in a state of engaging the locking device body 21a.

FIG. 3 is the tailgate structure of the embodiment, showing a state in which the film surface member 50 is fixed to the inner panel 30, and is the cross-sectional view taken along the line A-A in FIG. 1. As shown in FIG. 3, when the bolt members 101 and the nut members 102 are fastened to each other, in the locking opening 32 formed in the lower hem 32a of the inner panel 30, the locking device body 21a is fixed via the locking stiffener 21b.

Thus, the lower edge 51 of the film surface member 50 is fixed to the locking device 21 via the locking stiffener 21b, and the lower hem 32a of the inner panel 30 and the lower edge 51 of the film surface member 50 are connected to each other. Therefore, the lower edge 51 of the film surface member 50 is configured to be connected to and supported by the locking device 21 having a relatively high rigidity in the inner panel 30, and thus it is possible to obtain desired attachment strength.

(Fixing to Hinge Mounting Portion)

The tailgate 10 is provided with the hinge mechanism 3 including the left and right hinge mechanisms 3L, 3R for rotatably supporting the tailgate 10 to the vehicle body 1 in a direction (here, in the vehicle up-down direction: see FIGS. 1, 2) perpendicular to a vehicle interior-exterior direction, at another end 10b opposite to the one end 10a of the tailgate 10. The hinge mechanism 3 of this embodiment has the left and right hinge stiffeners 31L, 31R as reinforcing members at positions corresponding to the left and right hinge mechanisms 3L, 3R. The left and right hinge stiffeners 31L, 31R has a predetermined rigidity to support a weight of the tailgate 10, which is applied from the left and right hinge mechanisms 3L, 3R.

As shown in FIG. 4, when the left and right hinge mechanisms 3L, 3R are fixed to left and right hinge mounting portions 33L, 33R, the left and right hinge stiffeners 31L, 31R are respectively fastened together with bolt members 101 and nut members 102. The left and right hinge stiffeners 31L, 31R are formed integrally with hinge extensions 31La, 31Ra extending toward a vehicle down direction. Film surface mounting holes 31Lb, 31Rb are respectively formed in the vicinity of bottom edges of the hinge extensions 31La, 31Ra.

Meanwhile, mounting holes 52a, 52a are respectively formed at positions corresponding to the film surface mounting holes 31Lb, 31Rb in both side edges of an upper edge 52 of the film surface member 50. Then, by inserting mounting pin members 53, 53 into the mounting holes 52a, 52a and the film surface mounting holes 31Lb, 31Rb, the upper edge 52 of the film surface member 50 is fixed to the left and right hinge stiffeners 31L, 31R, and is connected to and supported by the inner panel 30 via the left and right hinge stiffeners 31L, 31R.

(Fixing of Rear Wiper Device)

As shown in FIG. 4, the inner panel 30 is formed with a wiper mounting portion 36 on a lower edge side of the glass opening portion 35 to which the rear glass panel 60 (see FIG. 1) is attached. The wiper mounting portion 36 is provided in a central position in the vehicle width direction on the lower edge side of the glass opening portion 35 of the inner panel 30, and is provide with wiper mounting holes 36a, 36a at a peripheral edge of a seat surface portion thereof. Then, the rear wiper device 70 is fastened together with mounting holes 52c, 52c formed in the upper edge 52 of the film surface member 50 by bolt members 101, 101 and nut members 102, 102, and is fixed to the wiper mounting portion 36.

By fastening the bolt members 101 and nut members 102, the upper edge 52 of the film surface member 50 is fixed to the same position as the rear wiper device 70 via the wiper mounting portion 36. Therefore, it is possible to fix the upper edge 52 of the film surface member 50 to the same position where the inner panel 30 and the rear wiper device 70 are joined and attachment strength is improved.

(Shape of film surface member)

FIG. 5 is a front view of the film surface member 50 used in the tailgate structure of the embodiment. The film surface member 50 has an upper main bridge portion 50A, a central main bridge portion 50C and a lower main bridge portion 50B, which are linearly bridged in parallel with the lower edge 51 and the upper edge 52, across from a left edge 50L, which is one end thereof in a direction (left-right direction) perpendicular to the vehicle interior-exterior direction, to a right edge 50R which is another end thereof.

Further, the film surface member 50 has bridge portions 50D to 50J, which connect the upper main bridge portion 50A, the central main bridge portion 50C and the lower main bridge portion 50B to each other in directions intersecting a direction of extension of the upper main bridge portion 50A, the central main bridge portion 50C and the lower main bridge portion 50B. Among them, the bridge portion 50D connects the upper main bridge portion 50A and the central main bridge portion 50C so as to be combined together, by extending a left and right pair of bridge-like portions thereof, in a direction substantially perpendicular to the upper main bridge portion 50A and the central main bridge portion 50C, while sandwiching an oval-shaped opening portion in a center thereof.

Then, bridge portions 50G 50H connects the lower main bridge portion 50B and the central main bridge portion 50C by extending in a direction substantially perpendicular to the lower main bridge portion 50B and the central main bridge portion 50C. Further, bridge portions 50E, 50F and bridge portions 50I, 50J are respectively provided on both sides in the vehicle width direction, and connect the upper main bridge portion 50A and the central main bridge portion 50C by extending in a direction substantially perpendicular to the upper main bridge portion 50A and the central main bridge portion 50C.

In this way, in the film surface member 50, for example, the upper main bridge portion 50A and the central main bridge portion 50C are connected to each other by the shortest distance. Therefore, when an impact is applied to the tailgate 10, the upper main bridge portion 50A, the central main bridge portion 50C and the lower main bridge portion 50B are hardly separated from each other, and resistance to deformation is excellent, as compared with a case where the upper main bridge portion 50A and the central main bridge portion 50C are connected to each other in a direction not perpendicular thereto. Further, the film surface member 50 can function as a film surface even after deformation.

The film surface member 50 of this embodiment is formed with film surface opening portions 55, 56 passing through the film surface member 50, by the upper main bridge portion 50A, the central main bridge portion 50C, the bridge portions 50E, 50F. and the bridge portions 50I, 50J. Further, radial bridge portions 50K, 50M extend in the vehicle width direction on both sides of the bridge portions 50G 50H. These radial bridge portions 50K, 50M obliquely connect the central main bridge portion 50C and the lower main bridge portion 50B.

Further, the upper main bridge portion 50A and the central main bridge portion 50C are respectively provided with a pair of convex bridge portions 50AL, 50AR and a pair of convex bridge portions 50CL, 50CR. The convex bridge portions 50AL, 50AR and the convex bridge portions 50CL, 50CR are formed in a shape bulging toward the outer panel 40 at positions opposite to bridge attachment portions 37a (to be described below) of the inner panel 30.

(Joining of Inner Panel and Outer Panel)

FIG. 6 is the tailgate structure of the embodiment, and is a front view showing a state in which the outer panel 40 is removed and the film surface member 50 is fixed to the inner panel 30. Among these, a configuration of the inner panel 30 will be described with reference to the exploded perspective view of FIG. 4.

The inner panel 30 made of resin in the embodiment is provided such that on an outer panel side surface thereof, first ribs 37, 37, second ribs 38, 38 and third ribs 39, 39 protrude from the inner panel 30 toward the outer panel 40. Among these, the first rib 37 extends to near both ends of a lower side of the glass opening portion 35 such that the locking device 21 and the left and right hinge stiffeners 31L, 31R of the left and right hinge mechanisms 3L, 3R are continuously connected. The first rib 37 is provided with the bridge attachment portion 37a provided in a vicinity of the lower edge side of the glass opening portion 35, and a projecting portion 37b continuously provided with the bridge attachment portion 37a.

Then, each of the bridge attachment portions 37a is joined to an opposing surface on the inner panel 30 side of the convex bridge portions 50AL, 50AR, and each of the projecting portions 37b, 37b is joined to an inner panel side surface of the outer panel 40 in a state of passing through the film surface opening portions 55, 56. Therefore, it is not necessary to perform processing such as forming a mounting portion on the inner panel side surface of the outer panel 40, unlike a case of fixing the film surface member 50 at substantially the entire surface, and thus there is no possibility to cause sink marks or the like on a vehicle exterior side surface of the outer panel 40. Therefore, it is possible to improve appearance quality of the outer panel 40.

Further, the tailgate structure of this embodiment is joined to the inner panel side surface of the outer panel 40 in the state in which the projecting portions 37b, 37b are penetrated through the film surface opening portions 55, 56. Therefore, in this joining state, the film surface member 50 and each of the projecting portions 37b, 37b are prevented from interfering with each other. Then, since the outer panel 40 and the inner panel 30 are made of a resin material, they can be joined to each other by an adhesive. Therefore, there is no need to complicate a shape of each of the projecting portions 37b, 37b, and it is possible to make a structure thereof simple.

Furthermore, the projecting portion 37b of the inner panel 30 is disposed adjacent to the bridge attachment portion 37a to be connected to the upper main bridge portion 50A. Thus, the inner panel 30 is connected or bonded adjacent to both the outer panel 40 and the film surface member 50. Therefore, as compared with a case where these connection portions are apart from each other, it is possible to reduce bias of a load applied to the inner panel 30 from the outer panel 40 and the film surface member 50, thereby stabilizing an attachment state even when there are three members.

Further, the tailgate structure of this embodiment is provided with a pair of stoppers 34, 34 for buffering an impact generated when closing the tailgate 10, at corner portions located on both ends in the vehicle width direction of a lower side portion of the inner panel 30. Then, the second rib 38 extends from the first rib 37 toward the stopper 34. Therefore, it is possible to improve rigidity around the stopper 34 on which a load is concentrated when closing the tailgate 10.

Further, the first rib 37 extends toward the left and right hinge stiffeners 31L, 31R continuously provided with the left and right hinge mounting portions 33L, 33R to which the left and right hinge mechanisms 3L, 3R are attached. Thus, the inner panel 30 between the locking device 21 and the left and right hinge mechanisms 3L, 3R is reinforced by the first rib 37 and the second rib 38. Therefore, rigidity of the entire tailgate 10 is improved, and thus deformation of the tailgate 10 is suppressed.

Further, as shown in FIG. 6, the radial bridge portions 50K, 50M are arranged extending in parallel with the second ribs 38, 38 at positions not overlapping the second ribs 38, 38 in a surface inside and outside direction. Further, in this embodiment, since the convex bridge portions 50CL, 50CR bulge toward the outer panel 40, the second ribs 38, 38 do not interfere with the radial bridge portions 50K, 50M and the convex bridge portions 50CL, 50CR, even when they are provided with a certain amount of projection. Therefore, it is possible to ensure a size of projection of the second ribs 38, 38, thereby further improving the rigidity of the entire tailgate 10.

Further, the rear wiper device 70 of this embodiment is fastened with the upper edge 52 of the film surface member 50 by the bolt members 101, 101 and the nut members 102, 102, and is fixed to the wiper mounting portion 36.

Then, the inner panel 30 is provided with a left and right pair of third ribs 39, 39 for connecting a periphery of the wiper mounting portion 36 of the rear wiper device 70 and the locking opening 32 to which the locking device 21 is fixed. The third ribs 39, 39 of this embodiment are constituted by a pair of convex rib portions, which respectively connects left and right edges in the vehicle width direction of the locking opening 32 and left and right edges in the vehicle width direction of the wiper mounting portion 36, and gradually narrows downward in the vehicle up-down direction.

In the tailgate structure of the embodiment constructed in this manner, the left and right pair of third ribs 39, 39 connects the locking device 21 and the rear wiper device 70. Thus, even when the rear wiper device 70 is frequently operated, it is possible to receive a load by dispersing the load toward the locking device 21. Therefore, the load applied from the rear wiper device 70 is directly applied to the inner panel 30 only at a peripheral edge of the wiper mounting portion 36, and thus it is possible to reduce possibility of deforming the tailgate 10.

(Summary of Operational Effects)

In the tailgate 10 of this embodiment, as shown in FIG. 3, the film surface member 50 made of metal which is provided between the inner panel 30 and the outer panel 40 is fastened by the bolt members 101 and the nut members 102 to the inner panel 30 together with the locking stiffener 21b which fixes the locking device 21 to the inner panel 30.

With this configuration, the lower edge 51 of the film surface member 50 made of metal is connected to and supported by the locking device 21 having a certain strength via the locking stiffener 21b. Thus, even when one of the inner panel 30 and the outer panel 40, which are made of resin and constitute the tailgate 10, is broken by an input of a load, the film surface member 50 made of metal does not drop off together with the locking device 21 remaining in the tailgate 10. Therefore, the film surface member 50 can effectively prevent luggage or parts from moving in an inside-outside direction, and has the same performance as a conventional iron gate against a deformation load after impact, as the film surface.

Further, as shown in FIG. 4, the mounting holes 52a, 52a formed in the left and right edges in the vehicle width direction of the upper edge 52 of the film surface member 50 are respectively connected to the film surface mounting holes 31Lb, 31Rb formed in the left and right hinge stiffeners 31L, 31R of the left and right hinge mechanisms 3L, 3R which are fixedly provided on the inner panel 30, by inserting the mounting pin members 53, 53. The upper edge 52 of the film surface member 50 is fixed to the inner panel 30 via the left and right hinge stiffeners 31L, 31R, while the lower edge 51 thereof is fixed to the inner panel 30 together with the locking stiffener 21b. As a result, the film surface member 50 can be a both support structure at the upper edge 52 and the lower edge 51 by the one end 10a and the other end 10b of the tailgate 10 in the direction perpendicular to the vehicle interior-exterior direction.

Further, in this embodiment, the film member 50 is fixed to and supported by strength members or functional parts including a robust case, such as the rear wiper device 70, the left and right hinge stiffeners 31L, 31R of the hinge mechanism 3, and the locking stiffener 21b for fixing the locking device 21 of the inner panel 30. Therefore, the film surface member 50 is provided in a tensioned state between the locking device 21 and the left and right hinge stiffeners 31L, 31R even when a load is applied thereto, and thus the film surface member 50 can more stably prevent broken pieces from moving to the inside-outside direction at the time of impact and also after deformation due to the impact, as compared with a case of adopting a single support structure.

Furthermore, in this embodiment, the rear wiper device 70 is fastened together with the upper edge 52 of the film surface member 50 by the bolt members 101 and the nut members 102, and is fixed to the wiper mounting portion 36 of the inner panel 30. The upper edge 52 of the film surface member 50 is supported by the rear wiper device 70 at a center in the vehicle width direction of the other end 10b of the tailgate 10. Therefore, even when a resin portion is broken at the time of the impact or after deformation due to the impact, it is possible to prevent the rear wiper device 70 from dropping off and scattering.

Further, as shown in FIG. 5, the film member 50 has the upper main bridge portion 50A, the central main bridge portion 50C and the lower main bridge portion 50B, which are linearly bridged in parallel with the lower edge 51 and the upper edge 52, across from the left edge 50L, which is the one end thereof in the direction perpendicular to the vehicle interior-exterior direction, to the right edge 50R which is the other end thereof. Thus, it is possible to improve rigidity in an extending direction of the upper main bridge portion 50A, the central main bridge portion 50C and the lower main bridge portion 50B. Therefore, it is further possible to improve rigidity as the film surface in order to prevent the luggage or the like inside the vehicle from falling out of the vehicle.

Further, the film surface member 50 has the bridge portions 50D to 50J, which connect the upper main bridge portion 50A and the central main bridge portion 50C to each other, and connect the central main bridge portion 50C and the lower main bridge portion 50B to each other, in the directions intersecting the direction of extension of the upper main bridge portion 50A, the central main bridge portion 50C and the lower main bridge portion 50B. Thus, it is possible to improve rigidity in the directions intersecting the direction of extension of the upper main bridge portion 50A, the central main bridge portion 50C and the lower main bridge portion 50B. Therefore, it is possible to improve rigidity as the film surface in order to prevent the luggage or the like inside the vehicle from falling out of the vehicle at the time of the impact on the tailgate 10 and after deformation due to the impact.

Then, the film surface member 50 has the bridge portions 50D to 50J and the radial bridge portions 50K, 50M, which connect the upper main bridge portion 50A, the central main bridge portion 50C and the lower main bridge portion 50B to each other. Further, the film surface opening portions 55, 56 and the like are subdivided by a plurality of bridge portions such as the bridge portion 50D, which are formed with an oval-shaped opening portion and are reduced in weight. Therefore, it is possible to receive the broken pieces as a net such that the broken pieces are not scattered inside or outside the vehicle when a load is applied to the tailgate 10, thereby more effectively preventing the luggage or the like inside the vehicle from falling out of the vehicle at the time of the impact and after deformation due to the impact, as compared with existing resin tailgates.

Furthermore, the tailgate 10 of this embodiment has the bridge portions 50D to 50J, which extend in directions perpendicular to the direction of extension of the upper main bridge portion 50A, the central main bridge portion 50C and the lower main bridge portion 50B of the film surface member 50, to connect them to each other. Thus, the upper main bridge portion 50A, the central main bridge portion 50C and the lower main bridge portion 50B of the film surface member 50 are connected by these bridge portions 50D to 50J at the shortest distance. Therefore, the upper main bridge portion 50A, the central main bridge portion 50C and the lower main bridge portion 50B can be hardly separated from each other when the tailgate receives the impact, for example, as compared with a case where the bridge portions 50D to 50J are not perpendicular to the direction of extension of the upper main bridge portion 50A, the central main bridge portion 50C and the lower main bridge portion 50B. Consequently, the film surface member 50 can function as the film surface having the same performance as the iron tailgate even after deformation of the film surface member 50.

Further, the projecting portions 37b, 37b provided in the first rib 37 of the inner panel 30 shown in FIG. 6 pass through the film surface opening portions 55, 56, and are connected to the inner panel side surface of the outer panel 40. They can be joined using an adhesive or the like. Thus, it is not necessary to form the mounting portion or the like on the inner panel side surface of the outer panel 40, and thus there is no possibility to cause sink marks or the like on the vehicle exterior side surface of the outer panel 40. Therefore, as shown in FIG. 1, in a state where the outer panel 40 is attached to the inner panel 30 by interposing the film surface member 50 therebetween, it is possible to improve appearance quality of a design surface located on the vehicle exterior side surface of the outer panel 40.

Further, in this joining state, while the file surface member 50 and each of the projecting portions 37b, 37b do not interfere with each other, the inner panel 30 made of a resin material can be easily joined by an adhesive to the outer panel 40 made of a resin material by passing the projecting portions 37b, 37b of the inner panel 30 through the film surface opening portions 55, 56. Furthermore, since the projecting portion 37b is continuously provided with the bridge attachment portion 37a, joining portions are concentratedly arranged, and thus it is possible to further improve the rigidity. Therefore, there is no need to complicate the shape of each of the projecting portions 37b, 37b, and it is possible to make the structure thereof simple.

In the inner panel 30 of this embodiment, the bridge attachment portion 37a and the projecting portion 37b, which are continuously provided in the first rib 37, are adjacently arranged. Therefore, as compared with a case where the bridge attachment portion 37a and the projecting portion 37b are arranged spaced from each other at a certain distance, it is possible to reduce deviation of a load applied to the inner panel 30 from the film surface member 50 and the outer panel 40, thereby stabilizing the attachment state even when there are three members of the inner panel 30, the outer panel 40 and the film surface member 50.

Further, the first rib 37 projecting from the inner panel 30 of this embodiment connects the locking device 21 and the left and right hinge mounting portions 33L, 33R to which the left and right hinge mechanisms 3L, 3R are attached. Consequently, a connection between the locking device 21 and the left and right hinge mechanisms 3L, 3R is reinforced by the first rib 37.

Then, the second rib 38 extends from the first rib 37 toward a portion where the stopper 34 is mounted. Therefore, it is possible to improve rigidity around the stopper 34 on which the load is concentrated when closing the tailgate 10. Further, as shown in FIG. 5, the radial bridge portions 50K, 50M are arranged extending in parallel with the second ribs 38, 38 at positions not overlapping the second ribs 38, 38 in the surface inside and outside direction, and do not interfere with the second ribs 38, 38 similarly to the convex bridge portions 50CL, 50CR which bulge to the outer panel 40 side. Therefore, it is possible to ensure the size of projection of the second ribs 38, 38.

Further, the left and right pair of third ribs 39, 39 connects the locking device 21 and the rear wiper device 70, to prevent deformation in the surface inside and outside direction. Therefore, it is possible to improve rigidity of the inner panel 30, thereby preventing deformation of the tailgate 10 by improving the rigidity of the entire tailgate 10.

Further, even when the rear wiper 70 is frequently operated, it is possible to receive the load by dispersing the load toward the locking device 21 from the third ribs 39, 39 of the inner panel 30. Therefore, the load applied from the rear wiper device 70 is directly applied to the inner panel 30 only at the peripheral edge of the wiper mounting portion 36, and thus it is possible to reduce possibility of deforming the tailgate 10.

Further, the rear wiper device 70 is fastened together with the upper edge 52 of the film surface member 50 by the bolt members 101 and the nut members 102, to be fixed to the inner panel 30. Therefore, it is possible to improve mounting rigidity of the rear wiper device 70, and there is no possibility that the rear wiper device 70 rattles or exhibits unstable behavior. Furthermore, it is possible to obtain practically advantageous operational effects such as suppressing increase in the number of parts without separately adding a part for reinforcement.

Further, it is possible to prevent noise generation due to vibration of the film surface, during traveling or when opening or closing of the tailgate, by providing a flange in the opening portions or other portions of the film surface member 50 or by providing a cushioning material or the like on the inner panel 30 and the outer panel 40 in a balanced manner.

Figure 7:
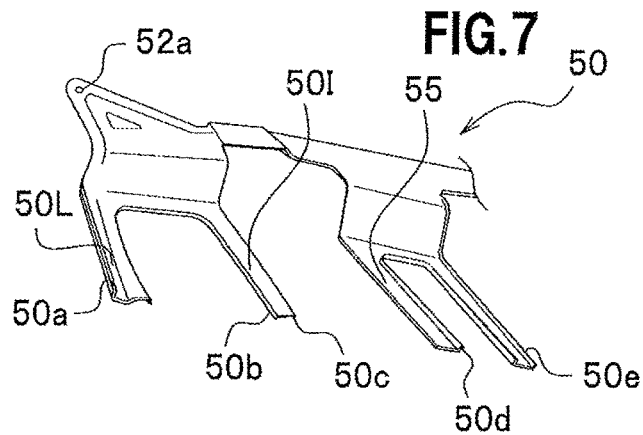
FIG. 7 is the tailgate structure of the embodiment, and is a partial cross-sectional view of the film surface member, taken along a line VII-VII in FIG. 5.

FIG. 7 is the tailgate structure of the embodiment, and is a partial cross-sectional view of the film surface member 50, taken along a line VII-VII in FIG. 5. The film surface member 50 of this embodiment is integrally formed with reinforcing flanges 50a to 50e on one side or both sides of the left edge 50L, the bridge portion 50I or a bridge portion at a peripheral edge of the film surface opening portion 55.

Figure 8:
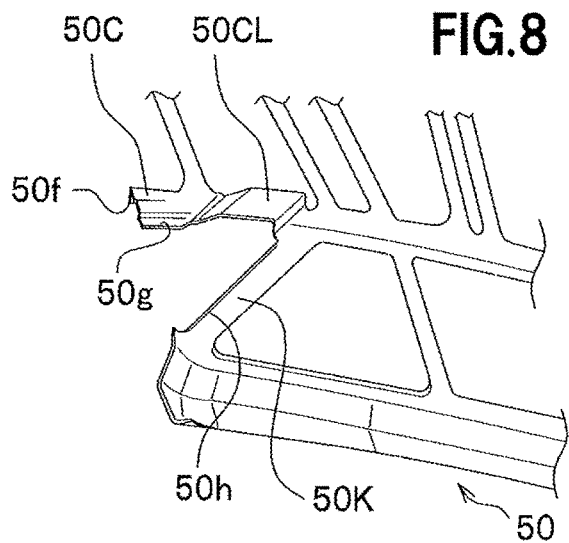
FIG. 8 is the tailgate structure of the embodiment, and is a partial cross-sectional view of the film surface member, taken along a line VIII-VIII in FIG. 5.

FIG. 8 is the tailgate structure of the embodiment, and is a partial cross-sectional view of the film surface member 50, taken along a line VIII-VIII in FIG. 5. The film surface member 50 of this embodiment is integrally formed with reinforcing flanges 50f to 50h on one side or both sides of the central main bridge portion 50C and the radial bridge portion 50K.

Figure 9:
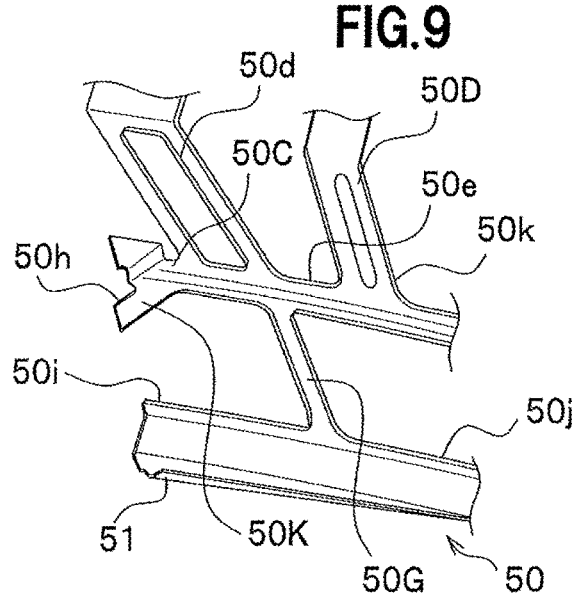
FIG. 9 is the tailgate structure of the embodiment, and is a partial cross-sectional view of the film surface member, taken along a line IX-IX in FIG. 5.

FIG. 9 is the tailgate structure of the embodiment, and is a partial cross-sectional view of the film surface member 50, taken along a line IX-IX in FIG. 5. The film surface member 50 of this embodiment is integrally formed with reinforcing flanges 50i to 50k around the opening portions. In this way, the film surface member 50 of this embodiment is integrally formed with the reinforcing flanges 50a to 50k at the bridge portions and the opening portions. Therefore, it is possible to prevent noise generation by suppressing vibration of the film surface member 50.

Hereinabove, the tailgate structure according to the present embodiment has been described in detail with reference to the drawings, however, the present invention is not limited to these embodiments, and it is of course possible to appropriately modify the embodiments without departing from the scope of the present invention.

For example, in the embodiments, the film surface member 50 made of iron to be fixed to the inner panel 30 has been described, however, it is not limited thereto, and may be made of, for example, a chemical synthetic fiber mesh, or other metals such as aluminum, stainless steel or duralumin. Then, as long as the film surface member 50 made of metal, which is provided between the inner panel 30 and the outer panel 40 made of resin, is fixed to the locking device 21, the shape, quantity and material of the film surface member are not particularly limited.

Further, in the embodiments, the tailgate 10, which is rotatably supported at the upper edge 2a of the opening portion 2 via the left and right hinge mechanisms 3L, 3R, and is opened and closed in the vehicle up-down direction, has been described, however, for example, it may be a tailgate, which is rotatably supported by the hinge mechanism 3 provided on one of left and right edges of the opening portion 2, and is opened and closed in a vehicle left direction or right direction. Then, as long as the tailgate is provided with the locking device 21 at one end thereof and the hinge mechanism 3 for supporting the tailgate rotatably to the vehicle body 1 at the other end thereof, in the direction perpendicular to the vehicle interior-exterior direction of the tailgate, the shape, quantity and open/close direction of the tailgate are not particularly limited.

REFERENCE SIGNS LIST

1: vehicle body
2: opening portion
2a: one side edge (upper edge)
3: hinge mechanism
3L, 3R: left and right hinge mechanism
10: tailgate
10a: one end
10b: the other end
20: locking mechanism
21: locking device
22: striker
30: inner panel
31L: left hinge stiffener
31La: hinge extension
31Lb: film surface mounting hole
32: locking opening
33L: left hinge mounting portion
34: stopper
35: glass opening portion
36: wiper mounting portion
37: first rib
37a: bridge attachment portion
37b: projecting portion
38: second rib
39: third rib
40: outer panel
50: film surface member
50A: upper main bridge portion
50AL, 50AR, 50CL, 50CR: convex bridge portion
50B: lower main bridge portion
50C: central main bridge portion
50D to 50J: bridge portion
50K, 50M: radial bridge portion
50L: left edge
50R: right edge
51: lower edge
51a, 52a: mounting hole
52: upper edge
53: mounting pin member
55: film surface opening portion
60: rear glass panel
70: rear wiper device
100: vehicle
101: bolt member
102: nut member

The invention claimed is:

1. A tailgate structure comprising:
a tailgate which is provided capable of opening and closing an opening portion of a vehicle body; and
a locking device which is provided at the tail gate and is engaged with the opening portion in a state in which the tailgate closes the opening portion,
wherein the tailgate comprises:
an inner panel made of resin;
an outer panel made of resin; and
a drop-off prevention member, which is provided between the inner panel and the outer panel, and
wherein the drop-off prevention member is fixed to the locking device, and comprises a plurality of main bridge portions which are linearly bridged over from one end to another end of the drop-off prevention member in a direction perpendicular to a vehicle interior-exterior direction, and bridge portions which connect the main bridge portions to each other in a direction intersecting a direction of extension of the main bridge portions.

2. The tailgate structure according to claim 1,
wherein the locking device is provided at one end of the tailgate in a direction perpendicular to a vehicle longitudinal direction,
wherein a hinge mechanism for rotatably supporting the tailgate to the vehicle body is provided at another end of the tailgate in the direction perpendicular to the vehicle longitudinal direction; and
wherein the drop-off prevention member is fixed to the hinge mechanism.

3. The tailgate structure according to claim 1,
wherein the bridge portions are connected in a direction substantially perpendicular to the main bridge portions.

4. The tailgate structure according to claim 1,
wherein the drop-off prevention member is formed with an opening portion passing through the drop-off prevention member by the main bridge portions and the bridge portions, and the inner panel has a projecting portion projecting toward the outer panel from the inner panel and is joined to the outer panel in a state in which the projecting portion is penetrated through the opening portion.

5. The tailgate structure according to claim 4,
wherein the inner panel has a bridge attachment portion which is connected to one of the main bridge portions, and the bridge attachment portion is disposed adjacent to the projecting portion.

6. The tailgate structure according to claim 1,
wherein the tailgate is provided with a stopper for buffering impact which occurs when closing the tailgate, and
wherein the inner panel is provided with a first rib for connecting the locking device and a hinge mechanism, and is further provided with a second rib which is connected to the first rib and extends toward the stopper.

7. The tailgate structure according to claim 6,
wherein the bridge portions comprises a radial bridge portion which extends parallel to the second rib at a position not overlapping the second rib in a surface inside and outside direction.

8. A tailgate structure, comprising:
a tailgate which is provided capable of opening and closing an opening portion of a vehicle body; and
a locking device which is provided at the tail gate and is engaged with the opening portion in a state in which the tailgate closes the opening portion,
wherein the tailgate comprises:
an inner panel made of resin;
an outer panel made of resin; and a drop-off prevention member, which is provided between the inner panel and the outer panel,
wherein the drop-off prevention member is fixed to the locking device, and
wherein the inner panel is provided with a rib, which is attached with a wiper device and connects the wiper device and the locking device.

9. The tailgate structure according to claim 8,
wherein the wiper device is joined to the inner panel and the drop-off prevention member at a same position.

* * * * *